(12) United States Patent
Irwin

(10) Patent No.: US 11,554,674 B1
(45) Date of Patent: Jan. 17, 2023

(54) SYSTEM OF AND METHOD FOR RECOVERING ENERGY AND PROVIDING POWER IN A MULTI-SOURCE TRANSMISSION ASSEMBLY

(71) Applicant: 21st Green Vehicle Drive Systems LLC, Lewes, DE (US)

(72) Inventor: Earl E. Irwin, Bradenton, FL (US)

(73) Assignee: 21st Green Vehicle Drive Systems LLC, Lewes, DE (US)

( * ) Notice: Subject to any disclaimer, the term of this patent is extended or adjusted under 35 U.S.C. 154(b) by 0 days.

(21) Appl. No.: 17/835,178

(22) Filed: Jun. 8, 2022

Related U.S. Application Data

(60) Provisional application No. 63/202,366, filed on Jun. 8, 2021.

(51) Int. Cl.

| | |
|---|---|
| *F16H 59/02* | (2006.01) |
| *B60L 7/10* | (2006.01) |
| *B60K 1/02* | (2006.01) |
| *B60L 50/60* | (2019.01) |
| *F16H 57/04* | (2010.01) |
| *F16H 57/00* | (2012.01) |
| *F16H 59/48* | (2006.01) |

(52) U.S. Cl.
CPC ............. *B60L 7/10* (2013.01); *B60K 1/02* (2013.01); *B60L 50/60* (2019.02); *F16H 57/0018* (2013.01); *F16H 57/0457* (2013.01); *F16H 57/0495* (2013.01); *F16H 59/48* (2013.01); *F16H 2059/0221* (2013.01)

(58) Field of Classification Search
CPC ... B60L 7/10; B60L 50/60; B60K 1/02; F16H 57/0018; F16H 57/0457; F16H 57/0495; F16H 59/48; F16H 2059/0221
See application file for complete search history.

(56) References Cited

U.S. PATENT DOCUMENTS

| | | | | |
|---|---|---|---|---|
| 5,120,282 | A * | 6/1992 | Fjallstrom | B60K 6/365 903/910 |
| 7,140,461 | B2 * | 11/2006 | Morrow | B60K 6/445 180/65.245 |
| 9,764,631 | B2 * | 9/2017 | Kim | B60K 6/36 |
| 10,525,817 | B2 | 1/2020 | Irwin | |
| 10,797,568 | B2 * | 10/2020 | Ohzu | H01L 41/125 |
| 2003/0100395 | A1 * | 5/2003 | Hiraiwa | B60K 6/445 903/910 |

* cited by examiner

*Primary Examiner* — Justin Holmes
(74) *Attorney, Agent, or Firm* — Owen G. Behrens; Smith & Hopen, P.A.

(57) ABSTRACT

Described herein relates to a system of and method for recovering energy and providing power in a multi-source transmission assembly, in which the transmission assembly includes secondary power sources in combination with a primary power source, where the secondary power sources are in reverse rotation with respect to the primary power source, such that energy is recovered during deceleration or the secondary power sources power the vehicle as needed. During the translation of a vehicle employing the transmission assembly, at least one motor may function, as needed, to propel the vehicle forward. During times in which the vehicle may not positively accelerating, at least one of the motors may switch to a generator mode to generate energy to be stored in a vehicle battery. As such, at least one of the motor power sources may recover an amount of energy expended by the vehicle during acceleration.

20 Claims, 2 Drawing Sheets

SYSTEM OF AND METHOD FOR RECOVERING ENERGY AND PROVIDING POWER IN A MULTI-SOURCE TRANSMISSION ASSEMBLY

CROSS-REFERENCE TO RELATED APPLICATIONS

This nonprovisional application claims the benefit of U.S. Provisional Application No. 63/202,366 entitled "ELECTRIC VEHICLE TRANSMISSION ASSEMBLY INCLUDING SECONDARY POWER SOURCES IN REVERSE ORIENTATION FROM A PRIMARY POWER SOURCE" filed Jun. 8, 2021, by the same inventor, all of which is incorporated herein by reference in their entirety.

BACKGROUND OF THE INVENTION

1. Field of the Invention

This invention relates, generally, to transmission assemblies that increase mileage economy and motor efficiency. More specifically, it relates to a system of and method for recovering energy and providing power in a multi-source transmission assembly, in which the transmission assembly includes secondary power sources in combination with a primary power source, where the secondary power sources are in reverse rotation with respect to the primary power source, such that energy is recovered during deceleration or the secondary power sources power the vehicle as needed.

2. Brief Description of the Prior Art

Conventional vehicles employ manual or automatic transmissions, or drivetrains, which include different speeds, or gears, that control engine output to translate a vehicle in forward and reverse directions. Typically, vehicles include a singular transmission assembly including a gearbox; however, attempts have been made to combine a singular transmission assembly with a supplemental transmission assembly that is designed to improve energy efficiency and reduce engine or motor load, decreasing the shift time between gears and making shifts smoother, quicker, and more efficient than in previously existing systems. An example of such a supplemental transmission assembly is found in U.S. Pat. No. 10,525,817.

All transmission assemblies require transmission gear lube or fluid to lubricate and cool the moving internal parts of the assembly. However, for higher speed implementations, oil splash or oil bath is typically employed as a reservoir including oil or another fluid lubricant, used to continuously lubricate the gears within the gearbox. By employing an oil bath to continuously lubricate, without entirely immersing, the gears within the gearbox, friction losses can be reduced, thereby improving transmission efficiencies.

In addition to the attempts to improve efficiencies related to transmission assemblies by including a supplemental transmission assembly, or by employing an oil bath, various attempts have been made to recover energy that would typically be lost due to friction during the typical use of the transmission assembly. For example, certain hybrid electric vehicles utilize an electric motor that is capable of rotation in both forward and backward directions, during which forward rotation is associated with forward motion of the vehicle, and backward rotation is associated with reverse motion of the vehicle.

Accordingly, what is needed is a transmission assembly including one or more secondary power sources, such as motors, that are in communication with, and that are designed to run concurrently with, the primary power source, in a reverse orientation with respect to the primary power source. This reverse rotation is inherent with the geared design in which two meshed gears always turn in reverse direction. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a transmission assembly for providing additional power to a vehicle and recovering energy during deceleration. In an embodiment, the transmission assembly may comprise a primary front shaft configured to be disposed in a housing, such that the primary front shaft is in in mechanical communication with a first alternative front shaft and a second alternative front shaft. Accordingly, the first alternative front shaft and the second alternative front shaft may be configured to rotate in a direction opposite to the primary front shaft rotation. The transmission assembly may further comprise a primary power source which may have a first end and a second end. As such, the first end of the primary power source may be configured to be in mechanical communication with the primary front shaft, such that the second end of the primary power source may be in mechanical communication to a motor output shaft. In addition, in this embodiment, the motor output shaft may be configured to transfer mechanical energy to at least one drive wheel of the vehicle. In this embodiment, a second power source may be disposed outside the housing, while the second power also is in mechanical communication with the first alternative front shaft. Moreover, a third power source may also be disposed outside the housing, while the third power source is in mechanical communication with the second alternative front shaft. Furthermore, in an embodiment, the transmission assembly may include a first set of drive gears, where the first set of drive gears may be configured to be in mechanical communication with the primary front shaft and the first alternative front shaft, and a second set of drive gears, where the second set of drive gears may be configured to be in mechanical communication with the primary front shaft and the second alternative front shaft. In this manner, at least one of the front shafts, individually or in combination, may be configured to expend energy by transferring mechanical energy to the motor output shaft during positive acceleration of the vehicle. Accordingly, in this embodiment, at least one of the power sources may also be configured to switch to a power generator mode during deceleration of the vehicle to recover and store energy in a battery of the vehicle.

In an embodiment, the transmission assembly may further include at least one shift fork, which may be configured to be in mechanical communication with the first alternative front shaft, when at least one shift fork is coupled to at least one of the first set of drive gears. Additionally, in this embodiment, at least one shift fork may also be configured to be in mechanical communication with the second alternative front shaft, when at least one shift fork is coupled to at least one of the second set of drive gears. In this manner, in this embodiment, as the at least one shift fork is coupled to at least one of the first set of drive gears, the at least one shift fork may be configured to engage with the primary front shaft, such that when the primary front shaft is engaged with the at least one shift fork, the at least one of the first set of drive gears may be configured to rotate the first alternative front shaft in a direction opposite the rotation of the primary front shaft. As such, in this embodiment, as the at least one shift fork is coupled to at least one of the second set of drive gears, when the primary front shaft is engaged with the at least one shift fork, the at least one of the second set of drive gears may be configured to rotate the second alternative front shaft in a direction opposite the rotation of the primary front shaft.

Moreover, in an embodiment, the first alternative front shaft and the second alternative front shaft may be configured to operate in combination with each other. In some embodiments, when the at least one shift fork is decoupled from at least one of the first set of drive gears, the first alternative front shaft may be configured to expend energy by transferring mechanical energy to the motor output shaft during positive acceleration of the vehicle. Accordingly, in these other embodiments, when the at least one shift fork is decoupled from at least one of the second set of drive gears, the second alternative front shaft may additionally be configured to expend energy by transferring mechanical energy to the motor output shaft during positive acceleration of the vehicle.

Furthermore, in an embodiment, the transmission assembly may further have at least one synchronizer, such that, as the at least one shift fork is coupled to at least one of the first set of drive gears and second set of drive gears, the at least one synchronizer may be configured to equate the rotational speed of the primary front shaft and at least one of the alternative front shafts during operation of the vehicle. In this embodiment, the housing of the transmission assembly may also be configured to retain a predetermined amount of oil, allowing an oil bath to be formed within the housing. As such, the oil bath may be configured to reduce friction within the housing, such that energy loss due to heat emission is decreased to a minimum level.

Additionally, in another aspect, the present disclosure pertains to a transmission assembly system. In an embodiment, the transmission assembly system may comprise a primary front shaft configured to be disposed in a housing. In this embodiment, the housing may be configured to retain a predetermined amount of oil. Additionally, in this embodiment, the primary front shaft may be in mechanical communication with a first alternative front shaft and a second alternative front shaft. In this manner, the first alternative front shaft and the second alternative front shaft may be configured to rotate in a direction opposite to the primary front shaft rotation. In addition, in this embodiment, the transmission assembly system may include a primary power source which may have a first end and a second end, such that the first end of the primary power source may be configured to be in mechanical communication with the primary front shaft.

Moreover, the second end of the primary power source may be in mechanical communication to a motor output shaft. In this embodiment, the motor output shaft may be configured to transfer mechanical energy to at least one drive wheel of the vehicle. Furthermore, the transmission assembly system, in an embodiment, may further have a second power source which may be disposed outside the housing, where the second power may be in mechanical communication with the first alternative front shaft, and a third power source which may be disposed outside the housing, where the third power source being in mechanical communication with the second alternative front shaft. In this manner, the transmission assembly may further include a first set of drive gears, such that the first set of drive gears may be configured to be in mechanical communication with the primary front shaft and the first alternative front shaft.

Furthermore, in an embodiment, the transmission assembly may have at least one shift fork which may be configured to be in mechanical communication with at least one of the alternative front shafts, when at least one shift fork is coupled to at least one of the first set of drive gears and second set of drive gears. As such, in this embodiment, the transmission assembly system may further comprise at least one synchronizer, such that as the at least one shift fork is coupled to at least one of the first set of drive gears and second set of drive gears, the at least one synchronizer may be configured to equate the rotational speed of the primary front shaft and at least one of the alternative front shafts during operation of the vehicle. Accordingly, as the at least one shift fork is coupled to at least one of the first set of drive gears and second set of drive gears, the at least one shift fork may be configured to engage with the primary front shaft, such that as the primary front shaft is engaged with the at least one shift fork, the at least one of the first set of drive gears and second set of drive gears may be configured to rotate the at least one of the alternative front shafts in a direction opposite the rotation of the primary front shaft. As such, the at least one of the front shafts, individually and/or in combination, may also be configured to expend energy by transferring mechanical energy to the motor output shaft during positive acceleration of the vehicle. In this manner, in this embodiment, at least one of the power sources may be configured to switch to a power generator mode during deceleration of the vehicle to recover and store energy in a battery of the vehicle.

Additionally, in some embodiments, the predetermined amount of oil forms an oil bath In some embodiments, the oil bath is configured to reduce energy loss due to heat emission by reducing friction within the housing. In some embodiments, the second power source comprises an alternative battery of the vehicle. In some embodiments, the energy recovered during deceleration of the vehicle is stored in the alternative battery of the vehicle. In some embodiments, the third power source comprises an alternative battery of the vehicle In some embodiments, the energy recovered during deceleration of the vehicle is stored in the alternative battery of the vehicle.

Further, in another aspect, the present disclosure pertains to a method of recovering energy during deceleration of a vehicle. In an embodiment the method may comprise the following steps: (a) installing a transmission assembly into a vehicle; (b) positively accelerating the vehicle, via the transmission assembly; (c) decelerating the vehicle, via the transmission assembly; and (d) storing the recovered energy, via a battery of the vehicle, wherein the recovered energy may be used to either recharge the battery of the vehicle and/or to supplement the energy use of the battery of the vehicle.

In this embodiment, the transmission assembly may comprise a primary front shaft which may be configured to be disposed in a housing. The primary front shaft may be in mechanical communication with a first alternative front shaft and a second alternative front shaft, such that the first alternative front shaft and the second alternative front shaft may be configured to rotate in a direction opposite to the primary front shaft rotation. Additionally, the transmission assembly may comprise a primary power source which may have a first end and a second end. Accordingly, the first end of the primary power source may be configured to be in mechanical communication with the primary front shaft, while the second end of the primary power source may be in mechanical communication to a motor output shaft. Moreover, in this embodiment, the motor output shaft may be configured to transfer mechanical energy to at least one drive wheel of the vehicle.

Furthermore, in this embodiment, the transmission assembly may have a second power source which may be disposed outside the housing. As such, the second power may be in mechanical communication with the first alternative front shaft. In addition, a third power source may be disposed outside the housing, and the third power source may also be in mechanical communication with the second alternative front shaft. Moreover, in this embodiment, the transmission assembly may also include a first set of drive gears, such that the first set of drive gears may be configured to be in mechanical communication with the primary front shaft and the first alternative front shaft, and a second set of drive gears, such that the second set of drive gears may be configured to be in mechanical communication with the primary front shaft and the second alternative front shaft.

Accordingly, in this embodiment, while positively accelerating the vehicle via the transmission assembly, at least one of the front shafts, individually and/or in combination, may be configured to expend energy by transferring mechanical energy to the motor output shaft during positive acceleration of the vehicle. In this manner, in this embodiment, while decelerating the vehicle via the transmission assembly, at least one of the power sources may be configured to switch to a power generator mode, such that energy may be recovered. Furthermore, in this embodiment, while storing the recovered energy via the battery of the vehicle, the recovered energy may be used to either recharge the battery of the vehicle and/or to supplement the energy use of the battery of the vehicle.

In some embodiments, the method may further comprise the step of, after installing the transmission assembly, filling the housing of the transmission assembly with a predetermined amount of oil, such that an oil bath is formed within the housing.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
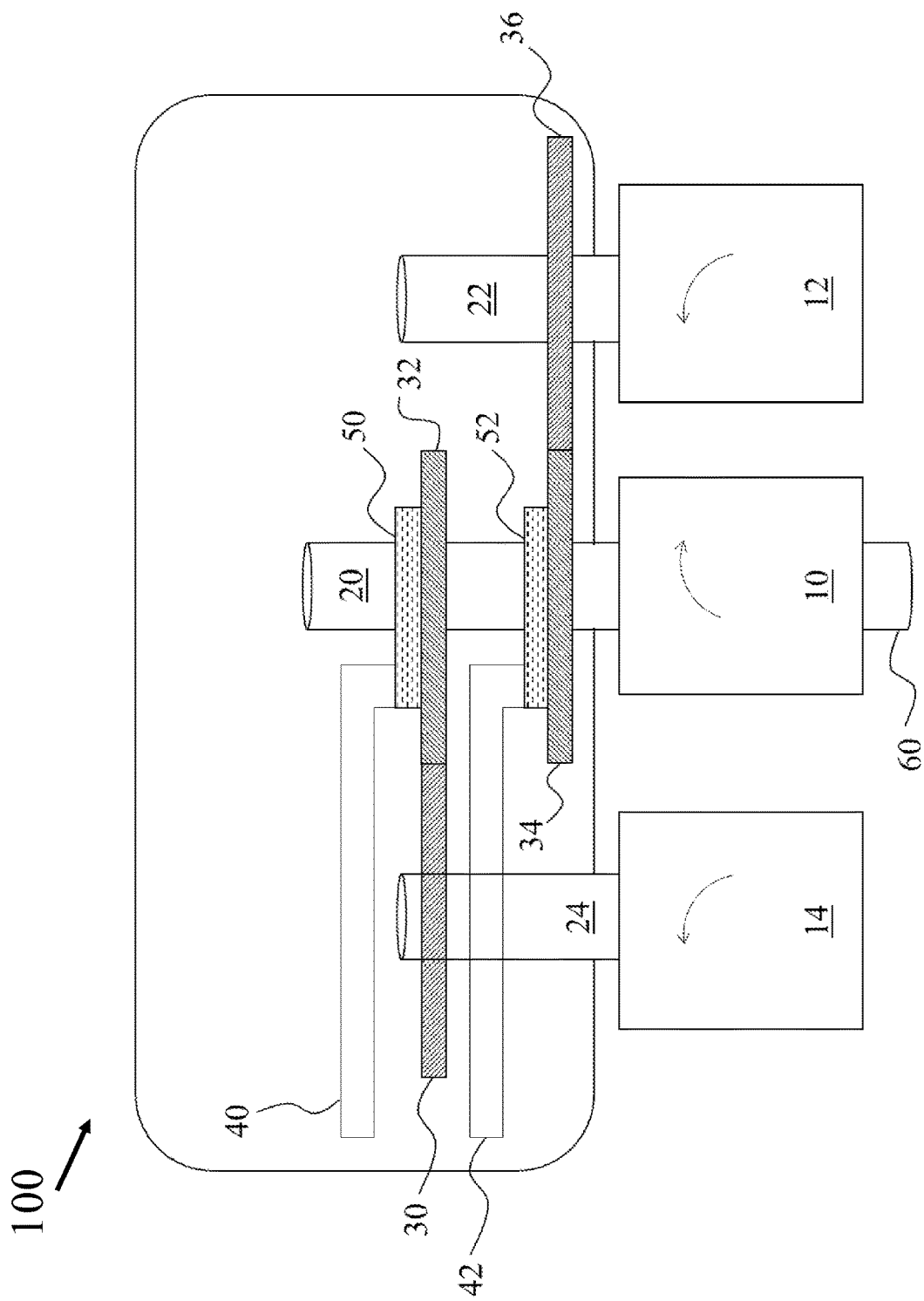
FIG. 1 is an orthogonal view of a transmission assembly including a primary motor in mechanical communication with at least one secondary motor, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, the term "power source" refers to any apparatus known in the art which may drive a vehicle. The primary power source may include but is not limited to a motor, a fuel cell, and/or a battery cell. For ease of reference, the exemplary embodiment described herein refers to a motor, but this description should not be interpreted as exclusionary of other power sources.

As used herein, the term "vehicle" refers to any self-propelled vehicle known in the art which does not operate on rails and is used for the transportation of people or cargo. Vehicle may comprise, but is not limited to, an automobile, an electric automobile, a semi-truck, an electric semi-truck, a motorcycle, an electric motorcycle, a scooter, a boat, and/or an electric boat. For ease of reference, the exemplary embodiment described herein refers to an automobile and/or an electric automobile, but this description should not be interpreted as exclusionary of other vehicles.

As used herein, "about" means approximately or nearly and in the context of a numerical value or range set forth means±15% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about." It is also to be understood, even if it is not always explicitly stated, that the structures described herein are merely exemplary and that equivalents of such are known in the art and can be substituted for the structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Transmission Assembly:

The present disclosure pertains to a transmission assembly that includes secondary power sources in combination with a primary power source, such as a motor, with the secondary power sources in reverse rotation with respect to the primary power source, such that energy is recovered during deceleration and/or the secondary power sources power the vehicle as needed. As shown in FIG. 1, in an embodiment, the transmission assembly 100 may include a housing enclosing at least one gear assembly. In some embodiments, transmission assembly 100 may be configured to be in mechanical communication with at least one power source. As such, in this embodiment, the transmission assembly may comprise a plurality of gear assemblies 30, 32, 34, 36 with transmission assembly 100 being in mechanical communication with a plurality of power sources 10, 12, 14.

In an embodiment, the housing of transmission assembly 100 may include a predetermined amount of oil, such that an oil bath is formed, reducing heat loss due to friction. In some embodiments the oil bath may surround the internal components housed within the transmission assembly 100, including but not limited to gear assemblies 30, 32, 34, and 36. Additionally, in some embodiments, transmission assembly 100 may house at least one front shaft. As such, in this embodiment, transmission assembly 100 may house a plurality of front shafts 20, 22, 24, which may be configured to be the driveshafts which may extend in a direction away from the housing. The driveshafts may be in mechanical communication with each of the plurality of power sources 10, 12, and 14, respectively (alternatively referred to as "motors"). In some embodiments, switching between each of the plurality of gear assemblies 30, 32, 34, 36 may be accomplished via one of shift forks 40, 42, and as such, gear speed synchronization may occur via synchronizers 50, 52. Each of the components within transmission assembly 100 and in mechanical communication with transmission assembly 100 will be discussed in further detail below.

As shown in FIG. 1, in an embodiment, primary power source 10 may be disposed outside of transmission assembly 100, and on a first end may be in mechanical communication with the internal components within transmission assembly 100. Additionally, in some embodiments, an opposing second end of primary power source 10 may be in mechanical communication with motor output shaft 60. In this manner the second end of primary power source 10 may be connected to the vehicle's driveshaft and wheels. For example, as a vehicle employing transmission assembly 100 propels forward and/or backward via an acceleration value, primary power source 10 and its connection to motor output shaft 60 may cause the positive rotation of the vehicle's wheels, resulting in the positive translation of the vehicle.

As noted above, the first end of primary power source 10 may be in communication with transmission assembly 100, and in particular with front shaft 20. As such, in some embodiments, front shaft 20 may be disposed within the housing of transmission assembly 100 and may be in indirect mechanical communication with motor output shaft 60. In this manner, in these other embodiments, the ultimate positive translation of the vehicle motor and/or motors at the time may result from an input from front shaft 20, via primary power source 10.

As shown in FIG. 1, front shaft 20 may be in mechanical communication with at least one secondary front shafts, such as secondary front shafts 22, 24. Accordingly, at least one of secondary front shafts 22, 24 may be disposed within the housing of transmission assembly 100. In addition, similar to front shaft 20, at least one of secondary front shafts 22, 24 may also be mechanically coupled to second power source 12 and third power source 14, respectively. In some embodiments, second power source 12 and third power source 14 may comprise at least one motor and/or battery cell. Moreover, in some embodiments, neither second power source 12 nor third power source 14 may be coupled to motor output shaft 60. Therefore, in these other embodiments, only primary power source 10 may be coupled to motor output shaft 60, such that vehicle translation occurs resulting from primary power source 10 and front shaft 20.

Another feature of the present disclosure is that the mechanical communication between front shaft 20 and the at least one secondary front shafts 22, 24 may comprise at least one drive gear assembly. As shown in FIG. 1, front shaft 20 may be in direct mechanical communication with at least one of second drive gear 32 and at least one of third drive gear 34. The at least one second drive gear 32 may form a coupling with first drive gear 30, which may be in direct mechanical communication with front shaft 24 and in indirect mechanical communication with third power source 14. Similarly, in some embodiments, the at least one second drive gear 34 may form a coupling with first drive gear 36, which may be in direct mechanical communication with front shaft 22 and in indirect mechanical communication with second power source 12. As such, while front shaft 20 rotates, front shaft 20 may be capable of selectively coupling with each of front shaft 22 and front shaft 24 via the drive gear assemblies described above.

Additionally, in an embodiment, transmission assembly 100 may also house at least one shift fork, for example shift fork 40 and shift fork 42, as shown in FIG. 1. In this embodiment, shift fork 40 may be mechanically coupled to at least front shaft 20 and/or third power source 14 by at least second drive gear 32 and/or first drive gear 30. Similarly, shift fork 42 may be mechanically coupled to at least front shaft 20 and/or second power source 12 via at least second drive gear 34 and/or first drive gear 36. Furthermore, in this embodiment, synchronizers may be used with at least one shift fork, for example shift fork 40, 42, as shown in FIG. 1, in order to reduce component wear and speed-up gear engagement, such that friction losses that would be incurred in the absence of a synchronizer may be reduced. As such, as shown in FIG. 1, in this embodiment, synchronizer 50 may be coupled to at least shift fork 40 and/or second drive gear 32, which may be in use during times in which front shaft 20 engages with at least front shaft 24 and/or third power source 14. Similarly, as shown in FIG. 1, synchronizer 52 may be coupled to at least shift fork 42 and/or second drive gear 34, which may be in use during times in which front shaft 20 engages with at least front shaft 22 and/or second power source 12.

While in use, in some embodiments, as the vehicle receives a positive acceleration force, front shaft 20 may rotate regardless of the coupling of the drive gear assemblies, as described above. Accordingly, as shown in FIG. 1, front shaft 20 may be configured to rotate in a clockwise direction. In this manner, in some embodiments, front shaft 20 may be configured to rotate in a counterclockwise direction. In an embodiment, as front shaft 20 rotates, the coupling of front shaft 20 to at least primary power source 10 may be such that primary power source 10 may power the rotation of front shaft 20. Moreover, in this embodiment, the coupling of primary power source 10 to motor output shaft 60 may be such that a rotation of front shaft 20 requires at least primary power source 10 and in turn may transfer mechanical energy to at least motor output shaft 60, which may be connected to the drive wheels, such that a positive translation of the vehicle is caused via the drive wheels. Moreover, while the vehicle receives the positive acceleration force, in this embodiment, at least front shaft 20 and/or primary power source 10 may only be engaged, such that energy is expended in order to power the vehicle's forward and/or reverse acceleration. As such, if additional power is needed to drive the vehicle, at least second power source 12 and/or third power source 14 may also be selected via the computerized drive control system of the vehicle.

In some embodiments, as the vehicle experiences a deceleration force, such as while the vehicle translates in a forward and/or reverse direction without positively accelerating (e.g., a vehicle that is slowing to a stop), at least one of the secondary front shafts and/or power sources may engage with front shaft 20 and primary power source 10. For example, in these other embodiments, as the vehicle decelerates, shift fork 42 may engage with front shaft 20 via first drive gear 36 coupling with second drive gear 34. The engagement of first drive gear 36 and second drive gear 34 may also be enhanced via synchronizer 52, which may be designed to enable and enhance energy recovery as all power sources transform instantly into generators during deceleration.

Another feature of the present disclosure is that when shift fork 42 engages with synchronizer 52 and front shaft 20, front shaft 20 may rotate second drive gear 34, such as in a clockwise direction, as shown in the embodiment of FIG. 1. In some embodiments, when shift fork 42 engages with synchronizer 52 and front shaft 20, front shaft 20 may rotate second drive gear 34, such as in a counterclockwise direction. In this manner, as second drive gear 34 meshes with first drive gear 36, first drive gear 36 may rotate in an opposite direction from second drive gear 34. In an embodiment, as shown in FIG. 1, first drive gear 36 may rotate in a counterclockwise direction. As such, first drive gear 36 may then rotate front shaft 22, which in turn may rotate second power source 12 in an opposite direction from the rotation of primary power source 10. Such rotation of second power source 12 during deceleration may cause an amount of energy captured in second power source 12, as a result of the rotation, to be stored within the vehicle battery as an energy recovery component of the system (e.g., also referred to as "power generator mode"). In some embodiments, the motors may alternate to power generator mode when no energy is applied.

Similarly, in an embodiment, as the vehicle decelerates, shift fork 40 may engage with front shaft 20 via first drive gear 30, allowing front shaft 20 to couple with second drive gear 32, which may be aided by synchronizer 50 in a manner similar to that of synchronizer 52, described in detail above. In some embodiments, when shift fork 40 engages with front shaft 20, front shaft 20 may rotate second drive gear 32, such as in a clockwise direction, as shown in the embodiment of FIG. 1. Accordingly, as second drive gear 32 meshes with first drive gear 30, first drive gear 30 may rotate in an opposite direction from second drive gear 32, allowing at least first drive gear 30 to rotate in a counterclockwise direction. As such, first drive gear 30 may rotate front shaft 24, which in turn rotates at least third power source 14 in an opposite direction from the rotation of primary power source 10. In some embodiments, the rotation of third power source 14 during deceleration may cause an amount of energy captured in third power source 14, as a result of the rotation, to be stored within vehicle battery 14, as an energy recovery component of the system (e.g., power generator mode). Additionally, in some embodiments, second power source 12 and third power source 14 may be utilized alone and/or in combination, depending on the energy recovery requirements of the vehicle. Accordingly, in these other embodiments, as power source 10 is powering the vehicle in a positive direction, power sources 12 and 14 may also power the vehicle in a positive direction. As such, all three power sources, if engaged, may either simultaneously power the vehicle and/or transform to generators for energy recovery.

Further, in an embodiment, during a subsequent acceleration event, such as when the vehicle receives an acceleration force to increase speed, at least one secondary power sources (e.g., second power source 12 and third power source 14) may transfer an amount of the stored battery energy to front shaft 20, and consequently to motor output shaft 60, via one and/or more of front shaft 22 and front shaft 24. The energy transfer may be accomplished via the gear couplings described above. In some embodiments, the energy may be transferred in an opposite direction from second power source 12 to primary power source 10, and/or from third power source 14 to primary power source 10.

In some embodiments, the control over the switching between primary power source 10, second power source 12, and third power source 14 may reside in a computer-controlled vehicle drive management system, similar to an engine control unit (ECU) typically found on modern vehicles that is in communication with the motors, transmission, sensors, and other components of the vehicle known in the art. In this manner, in vehicles with more complex computing units installed therein, the speed of the vehicle, as well as the shifting between gears, may be preset and dictated by the computing units. Moreover, GPS units may be used to read stored speed limits via a computing database and use the stored data to determine whether and/or when a gear shift may occur. Accordingly, the energy recover aspects of transmission assembly 100, as described above, may provide advantages for large transportation vehicles and fleets, to conserve battery energy, extend motor service limits, maintain safe vehicle operation and speed, and benefit drivers by undertaking some of the more traditional driver responsibilities.

Figure 2:
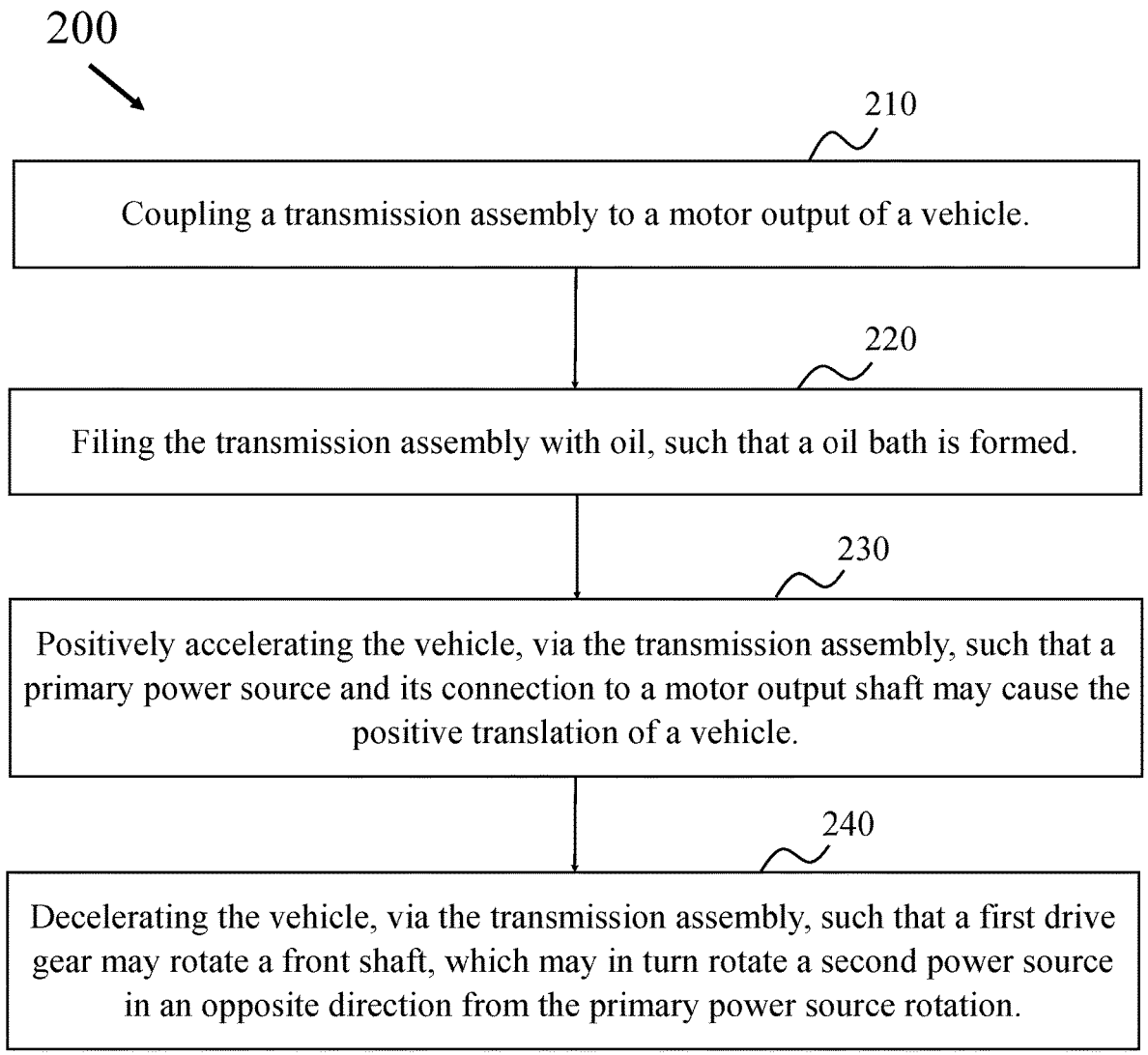
FIG. 2 is a flow chart depicting the steps of a method of capturing energy of a vehicle during deceleration, via at least one alternative power source, according to an embodiment of the present disclosure.

Method of Use:

Referring now to FIG. 1, in conjunction with FIG. 2, a method is depicted for recovering energy during deceleration of a vehicle comprising a transmission assembly which includes secondary power sources in combination with a primary power source, (e.g., a motor) with the secondary power sources in reverse rotation with respect to the primary power source. FIG. 2 is described in combination with the components shown in FIG. 1, as discussed in greater detail above. It is appreciated that the steps delineated in FIG. 2 may be performed in a singular step and/or in multiple steps, and, in fact, may include fewer and/or more steps than delineated in FIG. 2. Moreover, it is appreciated that that transmission assembly need not be coupled to an existing unit and may be installable on a new vehicle without requiring a fitting, retrofitting, and/or other coupling process.

As shown in FIG. 1, in conjunction with FIG. 2, the method 200 for installing a transmission assembly 100 that includes secondary power sources in combination with a primary power source, with the secondary power sources in reverse rotation with respect to the primary power source, begins at step 210, coupling transmission assembly 100 to motor output 60, such that primary power source 10 may be in mechanical communication with motor output shaft 60. As such, in an embodiment, the second end of primary power source 10 may be connected to the vehicle's driveshaft and wheels, as the first end of primary power source may be in mechanical communication with the internal components of transmission assembly 100. The next step, step 220, comprises filling transmission assembly 100 with oil, such that an oil bath is formed, reducing heat loss due to friction. Further, at step 230, accelerating the vehicle, via transmission assembly 100, such that as the vehicle employing transmission assembly 100 propels forward and/or backward via an acceleration value, primary power source 10 and its connection to motor output shaft 60 may cause the positive rotation of the vehicle's wheels, resulting in the positive translation of the vehicle. Finally, at step 240, after accelerating the vehicle, via positive acceleration from transmission assembly 100, decelerating the vehicle, such that, during deceleration, first drive gear 36 may then rotate front shaft 22, which in turn may rotate second power source 12 in an opposite direction from the rotation of primary power source 10. Accordingly, such rotation of second power source 12 during deceleration may cause an amount of energy captured in second power source 12, as a result of the rotation, to be stored within the vehicle battery as an energy recovery component of the system.

All referenced publications are incorporated herein by reference in their entirety, to the same extent as if each were incorporated by reference individually. Furthermore, where a definition and/or use of a term in a reference, which is incorporated by reference herein, is inconsistent and/or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A transmission assembly for providing additional power to a vehicle and recovering energy during deceleration, the transmission assembly comprising:
a primary front shaft configured to be disposed in a housing, the primary front shaft being in mechanical communication with a first alternative front shaft and a second alternative front shaft, wherein the first alternative front shaft and the second alternative front shaft are configured to rotate in a direction opposite to the primary front shaft rotation;
a primary power source having a first end and a second end, wherein the first end of the primary power source is configured to be in mechanical communication with the primary front shaft, whereby the second end of the primary power source is in mechanical communication to a motor output shaft, and wherein the motor output shaft is configured to transfer mechanical energy to at least one drive wheel of the vehicle;
a second power source disposed outside the housing, the second power source being in mechanical communication with the first alternative front shaft;
a third power source disposed outside the housing, the third power source being in mechanical communication with the second alternative front shaft;
a first set of drive gears, wherein the first set of drive gears is configured to be in mechanical communication with the primary front shaft and the first alternative front shaft;
a second set of drive gears, wherein the second set of drive gears is configured to be in mechanical communication with the primary front shaft and the second alternative front shaft;
wherein at least one of the front shafts, individually or in combination, is configured to expend energy by transferring mechanical energy to the motor output shaft during positive acceleration of the vehicle; and
wherein at least one of the power sources is configured to switch to a power generator mode during deceleration of the vehicle to recover and store energy in a battery of the vehicle.

2. The transmission assembly of claim 1, further comprising, at least one shift fork configured to be in mechanical communication with the first alternative front shaft, when coupled to at least one of the first set of drive gears.

3. The transmission assembly of claim 2, further comprising, at least one shift fork configured to be in mechanical communication with the second alternative front shaft, when coupled to at least one of the second set of drive gears.

4. The transmission assembly of claim 3, wherein as the at least one shift fork is coupled to at least one of the first set of drive gears, the at least one shift fork is configured to engage with the primary front shaft, whereby, when the primary front shaft is engaged with the at least one shift fork, the at least one of the first set of drive gears is configured to rotate the first alternative front shaft in a direction opposite the rotation of the primary front shaft.

5. The transmission assembly of claim 4, wherein as the at least one shift fork is coupled to at least one of the second set of drive gears, the at least one shift fork is configured to engage with the primary front shaft, whereby, when the primary front shaft is engaged with the at least one shift fork, the at least one of the second set of drive gears is configured to rotate the second alternative front shaft in a direction opposite the rotation of the primary front shaft.

6. The transmission assembly of claim 5, wherein the first alternative front shaft and the second alternative front shaft may be configured to operate in combination with each other.

7. The transmission assembly of claim 6, wherein, when the at least one shift fork is not coupled at least one of the first set of drive gears, the first alternative front shaft is configured to expend energy by transferring mechanical energy to the motor output shaft during positive acceleration of the vehicle.

8. The transmission assembly of claim 6, wherein, when the at least one shift fork is not coupled to at least one of the second set of drive gears, the second alternative front shaft is configured to expend energy by transferring mechanical energy to the motor output shaft during positive acceleration of the vehicle.

9. The transmission assembly of claim 1, further comprising, at least one synchronizer, wherein, as the at least one shift fork is coupled to at least one of the first set of drive gears and second set of drive gears, the at least one synchronizer is configured to equate the rotational speed of the primary front shaft and at least one of the alternative front shafts during operation of the vehicle.

10. The transmission assembly of claim 1, wherein the housing is configured to retain a predetermined amount of oil, whereby an oil bath is formed within the housing.

11. The transmission assembly of claim 10, wherein the oil bath is configured to reduce friction within the housing, thereby decreasing energy loss due to heat emission to a predetermined level.

12. A transmission assembly system, comprising:
a primary front shaft configured to be disposed in a housing, the housing being configured to retain a predetermined amount of oil, wherein the primary front shaft is in mechanical communication with a first alternative front shaft and a second alternative front shaft, and wherein the first alternative front shaft and the second alternative front shaft are configured to rotate in a direction opposite to the primary front shaft rotation;
a primary power source having a first end and a second end, wherein the first end of the primary power source is configured to be in mechanical communication with the primary front shaft, whereby the second end of the primary power source is in mechanical communication to a motor output shaft, and wherein the motor output shaft is configured to transfer mechanical energy to at least one drive wheel of the vehicle;
a second power source disposed outside the housing, the second power being in mechanical communication with the first alternative front shaft;
a third power source disposed outside the housing, the third power source being in mechanical communication with the second alternative front shaft;
a first set of drive gears, wherein the first set of drive gears is configured to be in mechanical communication with the primary front shaft and the first alternative front shaft;
at least one shift fork configured to be in mechanical communication with at least one of the alternative front shafts, when coupled to at least one of the first set of drive gears and second set of drive gears;
at least one synchronizer, wherein, as the at least one shift fork is coupled to at least one of the first set of drive gears and second set of drive gears, the at least one synchronizer is configured to equate the rotational speed of the primary front shaft and at least one of the alternative front shafts during operation of the vehicle;
wherein as the at least one shift fork is coupled to at least one of the first set of drive gears and second set of drive gears, the at least one shift fork is configured to engage with the primary front shaft, whereby, as the primary front shaft is engaged with the at least one shift fork, the at least one of the first set of drive gears and second set of drive gears is configured to rotate the at least one of the alternative front shafts in a direction opposite the rotation of the primary front shaft;
wherein at least one of the front shafts, individually or in combination, is configured to expend energy by transferring mechanical energy to the motor output shaft during positive acceleration of the vehicle; and
wherein at least one of the power sources is configured to switch to a power generator mode during deceleration of the vehicle to recover and store energy in a battery of the vehicle.

13. The transmission assembly system of claim 12, wherein the predetermined amount of oil forms an oil bath.

14. The transmission assembly system of claim 13, wherein the oil bath is configured to reduce energy loss due to heat emission by reducing friction within the housing.

15. The transmission assembly system of claim 12, wherein the second power source comprises an alternative battery of the vehicle.

16. The transmission assembly system of claim 15, wherein the energy recovered during deceleration of the vehicle is stored in the alternative battery of the vehicle.

17. The transmission assembly system of claim 12, wherein the third power source comprises an alternative battery of the vehicle.

18. The transmission assembly system of claim 17, wherein the energy recovered during deceleration of the vehicle is stored in the alternative battery of the vehicle.

19. A method of recovering energy during deceleration of a vehicle comprising:
installing a transmission assembly into a vehicle, the transmission assembly comprising:
a primary front shaft configured to be disposed in a housing, the primary front shaft being in mechanical communication with a first alternative front shaft and a second alternative front shaft, wherein the first alternative front shaft and the second alternative front shaft are configured to rotate in a direction opposite to the primary front shaft rotation;
a primary power source having a first end and a second end, wherein the first end of the primary power source is configured to be in mechanical communication with the primary front shaft, whereby the second end of the primary power source is in mechanical communication to a motor output shaft, and wherein the motor output shaft is configured to transfer mechanical energy to at least one drive wheel of the vehicle;
a second power source disposed outside the housing, the second power being in mechanical communication with the first alternative front shaft;
a third power source disposed outside the housing, the third power source being in mechanical communication with the second alternative front shaft;
a first set of drive gears, wherein the first set of drive gears is configured to be in mechanical communication with the primary front shaft and the first alternative front shaft;

a second set of drive gears, wherein the second set of drive gears is configured to be in mechanical communication with the primary front shaft and the second alternative front shaft;

positively accelerating the vehicle, via the transmission assembly, wherein at least one of the front shafts, individually or in combination, is configured to expend energy by transferring mechanical energy to the motor output shaft during positive acceleration of the vehicle;

decelerating the vehicle, via the transmission assembly, wherein at least one of the power sources is configured to switch to a power generator mode during deceleration, thereby recovering energy; and storing the recovered energy, via a battery of the vehicle, wherein the recovered energy is used to either recharge the battery of the vehicle or to supplement the energy use of the battery of the vehicle.

20. The method of claim 19, further comprising the step of, after installing the transmission assembly, filling the housing of the transmission assembly with a predetermined amount of oil, whereby an oil bath is formed within the housing.

\* \* \* \* \*